No. 852,424. PATENTED MAY 7, 1907.
T. A. EDISON.
SECONDARY BATTERY.
APPLICATION FILED NOV. 28, 1902.

3 SHEETS—SHEET 1.

Witnesses:
Jas. F. Coleman
Jno. Robt Taylor

Inventor
Thomas A. Edison
by Dyer Edmonds & Dyer
Attorneys

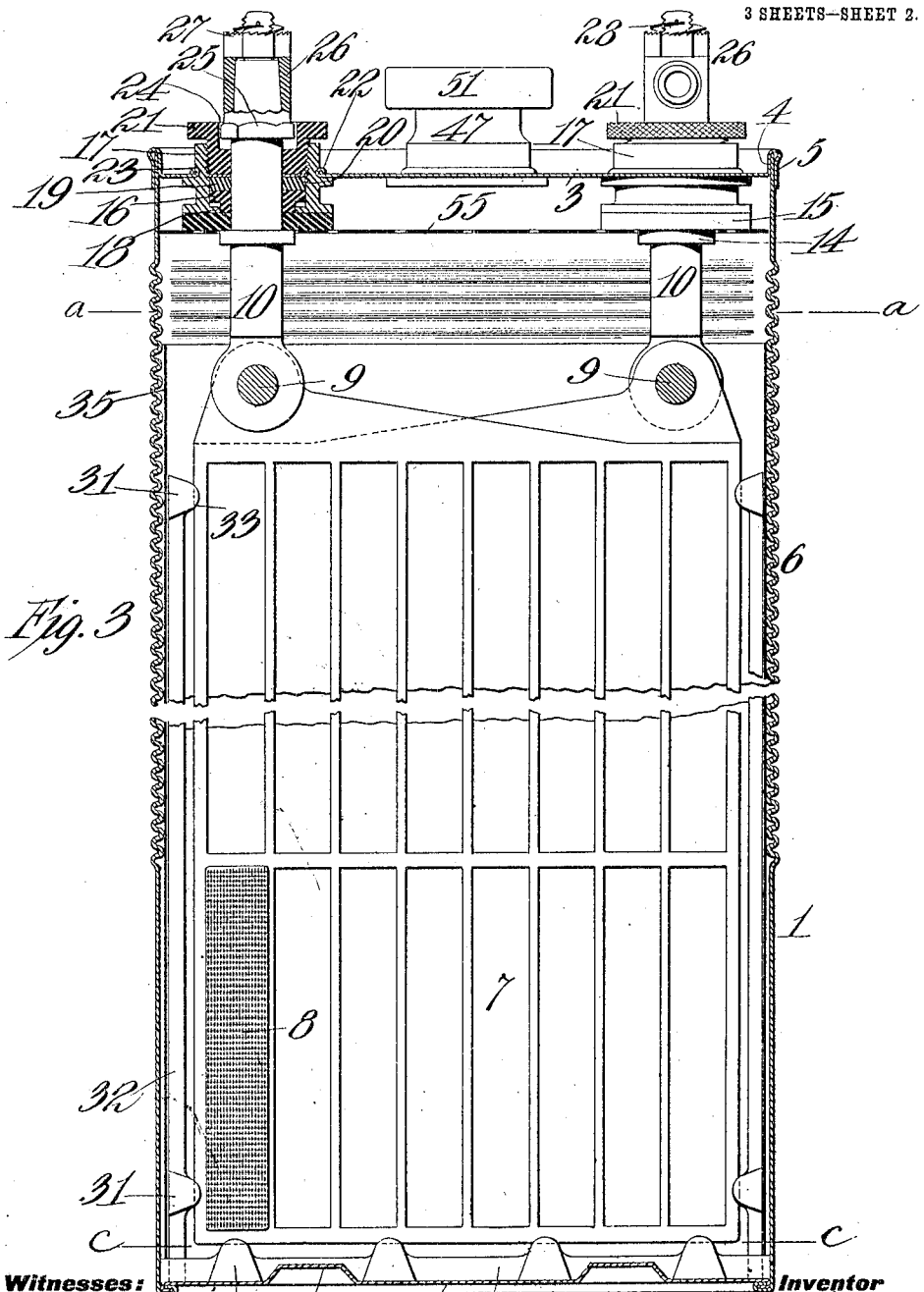

No. 852,424. PATENTED MAY 7, 1907.
T. A. EDISON.
SECONDARY BATTERY.
APPLICATION FILED NOV. 28, 1902.
3 SHEETS—SHEET 3.
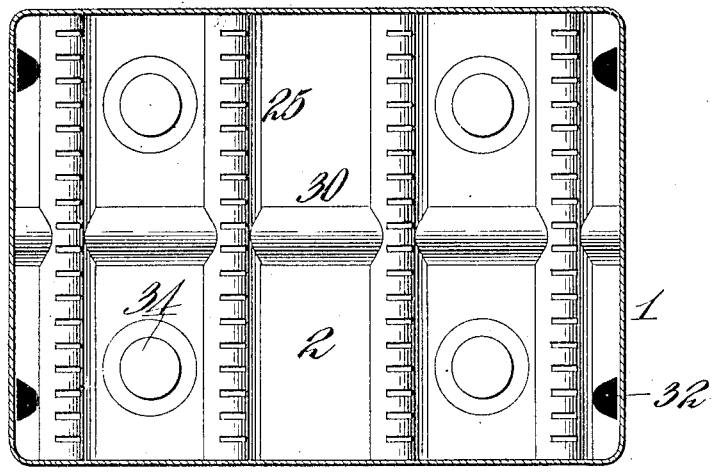

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF ORANGE, NEW JERSEY, A CORPORATION OF NEW JERSEY.

SECONDARY BATTERY.

No. 852,424.     Specification of Letters Patent.     Patented May 7, 1907.

Application filed November 28, 1902. Serial No. 133,112.

*To all whom it may concern:*

Be it known that I, THOMAS A. EDISON, a citizen of the United States, residing at Llewellyn Park, Orange, in the county of Essex and State of New Jersey, have invented a certain new and useful Improvement in Storage Batteries, of which the following is a description.

My invention relates to improvements in storage batteries, and particularly to the mechanical details of construction thereof.

While the present improvements have been designed specially for use in connection with storage batteries of the type invented by me wherein insoluble active materials are employed in an alkaline electrolyte, it will be understood that the improvements are applicable for use with storage batteries of other types.

My objects generally are to simplify the mechanical construction, improve the operation, and increase the efficiency of storage batteries, particularly of my improved type.

To this end the improvements relate, first, to a new containing vessel or can, which, while being light in weight, is extremely strong and rigid; second, to an improved manner of supporting the conductors which extend through the cover and are connected within the can to corresponding plates, whereby any leakage of gas or creeping of the solution around said conductors is prevented, while at the same time the arrangement is such that the several plates can be adjusted longitudinally in the can so as to be locked from vertical movement; third, to improvements in the devices for mechanically separating and electrically insulating the plates from one another; fourth, to improvements in the bottom support for sustaining the plates and at the same time electrically insulating them from each other; and finally, to details of construction by which the general efficiency of the device is improved, and all of which will be more fully hereinafter described and claimed.

Figure 1:
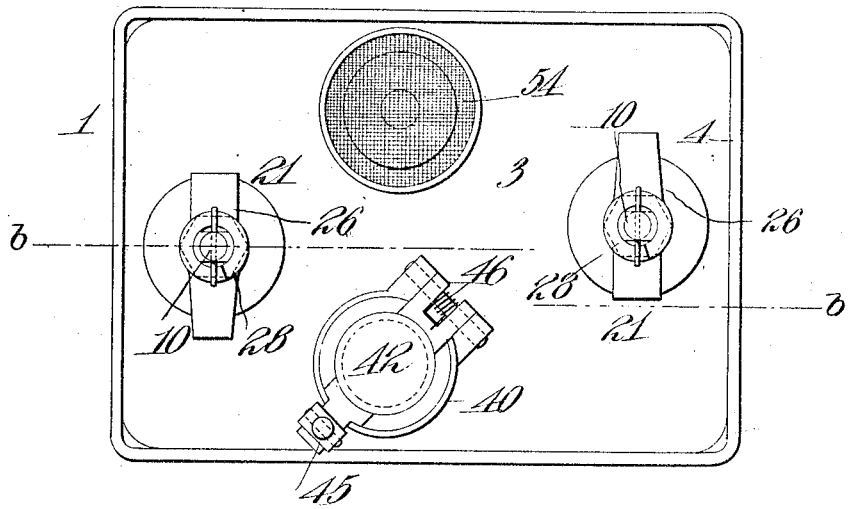
Figure 2:
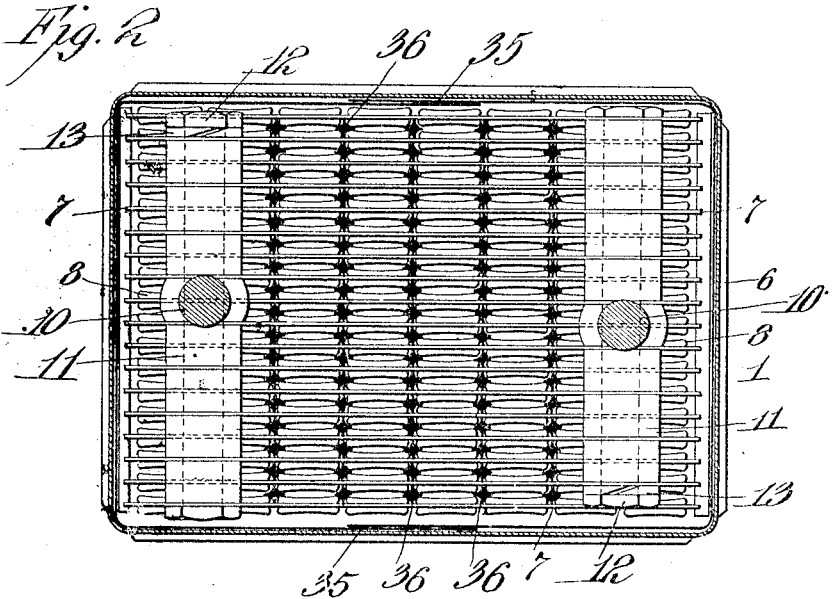

In order that the invention may be better understood, attention is directed to the accompanying drawings forming part of this specification, and in which Figure 1 is a plan view of the complete cell in its preferred form; Fig. 2 a horizontal section on the line $a-a$ of Fig. 3, showing an improved separator for mechanically separating the plates; Fig. 3 a vertical sectional view on the line $b-b$ of Fig. 1; and Fig. 4 a section on the line $c-c$ of Fig. 3, showing the preferred form of insulating support for the plates.

In all of the above views corresponding parts are represented by the same numerals of reference.

The can 1 is generally rectangular, as shown, being formed preferably of very thin sheet steel which has been carefully nickelplated so as to prevent oxidation, particularly in an alkaline solution. Obviously other metals than steel can be employed if carefully nickelplated, but steel is preferable owing to its cheapness and rigidity and to the fact that the nickelplated film can be welded to the steel, as I describe in U. S. Patent No. 734,522, granted July 28, 1903. The bottom 2, it will be noted, is secured in place by an interlocking joint so as to make a watertight joint even if solder is not used. This joint may, however, be soldered on the outside, and in some instances this may be desirable. All joints are preferably subjected to hydraulic pressure so as to be extremely tight.

The top 3 is provided with an upturned flange 4 having a return flange 5 so as to receive the upper end of the can. After the top has been placed in position, solder may be applied to the joint between the bottom of the flange 5 and the upper end of the can so as to make a perfectly tight joint. By employing a top of this character, the can is strengthened at its upper end from both expanding and compressing strains, so that the joint will at all times be perfectly airtight. This is an important, practical consideration, because I have found in practice that users of batteries ordinarily grasp the cans at the upper ends, tending to collapse the sides, and if ordinary tops were used, the strain so imposed would frequently tend to open up the seams between the top and the can. All four sides of the can are preferably formed with corrugations 6 struck out of the metal in the form of connected waves, as shown, by means of suitable dies. The corrugations are discontinuous or interrupted, so that they do not extend in a continuous line around the can. The corrugations are interrupted at the corners of the can (see Figs. 2 and 3)

whereby panels of corrugations entirely surrounded by plane metal are formed in the walls of the can. By corrugating the can in this way, it is materially strengthened against compressing and bulging strains, and all possibility of distortion thereof by a transverse yielding of the corrugations is prevented, while at the same time the cost of the can is only very slightly increased, and its weight can be reduced to a minimum.

The grids 7 are substantially like those which I have already described in prior patents, and carry a plurality of pockets 8 containing the active material, said pockets being crimped in position under pressure. The grids and pockets comprising the entire plate are made as heretofore of carefully nickel-plated steel, the nickelplated coating being preferably welded to the steel in an atmosphere of hydrogen gas. The pockets 8 correspond with those previously patented by me, with the exception that when the plate is first made, the sides of the pockets are concaved as shown, so that when any swelling of the active material takes place, the bulging of the pockets will not progress materially beyond a straight line. If the pockets are not concaved, I have found in practice that excessive bulging tends to bring the pockets of adjacent plates into dangerous proximity with one another to increase the possibility of short-circuiting when they are placed close together to save using an excess of electrolyte. This feature of concaving the pockets of a storage battery plate is described and claimed in Letters Patent No. 723,449, granted to me on March 24, 1903.

I find in practice that the electrolytically active nickel swells or bulges to a much greater extent than the iron, and where weight is the important consideration it is desirable to make the pockets or receptacles for containing the nickel of thicker sheet metal than those for the iron. For instance, the pockets for receiving the nickel may be made of sheet steel .005 of an inch in thickness, while for the iron the sheet steel may be as thin as .003 of an inch. Where lightness is not important, considerably thicker sheet steel may be used (owing to its cheapness as compared to extremely thin material), in which case the pockets for receiving the nickel may be made of sheet steel as thick as .01 of an inch, and for receiving the iron as thick as .005 of an inch. It is not desirable in practice to make the pockets or receptacles for receiving the nickel any thinner than .005 of an inch, as it is important that the metal should be strong enough to effectively resist excessive bulging.

Corresponding plates of the battery are connected together and are mounted on bolts 9 which pass also through the eye of a proper conductor 10 for the external circuit. The plates of each set are separated by washers 11, and all the plates are held rigidly together on the bolt 9 by nuts 12, a hardened split spring washer 13 of ordinary construction being employed on each bolt for locking the nut and preventing accidental loosening thereof. Each conductor 10 is formed with a shoulder 14, above which is received a hard rubber washer 15. Bearing on this washer is a smaller hard rubber washer 16 vertically movable in the metal sleeve 17 secured in the top 3, said sleeve being formed with a shoulder 18 at its lower end between the washers 15 and 16, and which shoulder limits the downward movement of the washer 16. Above the washer 16 in the sleeve 17 is an elastic packing 19 made preferably of soft rubber, and on top of this packing is a thin disk 20 made preferably of hard rubber. Bearing on the disk 20 is the lower end of a rubber nut 21 which engages threads in the upper end of the sleeve 17, so that by screwing downwardly on said nut the packing 19 can be compressed tightly around the conductor 10 to make a perfectly tight joint, while at the same time all of the plates in the set will be forced downward to engage them tightly with the insulating bottom support to prevent longitudinal movement of said plates in use. The sleeve 17 is secured in position by upsetting the metal of the top 3 to form a bead 22 engaging a recess 23 in said sleeve, thus making a very tight, substantial, durable and cheap joint, which requires no solder whatever, although it may be used. The hard rubber nut 21 is provided with an hexagonal recess 24 therein, with which engages the correspondingly shaped portion 25 of a terminal 26, the latter fitting over the tapered outer end of the conductor 10 and being held in place by a nut 27 which is locked from rotation by a split washer 28, as shown. By means of this construction the conductor 10 will not only be secured in position in such a way as to prevent creeping of the solution around the same, but will at the same time be effectively insulated from the corresponding conductor for the other plates.

At their bottom the plates are received on a suitable insulating support, the preferred construction of which is indicated in Figs. 3 and 4, said support comprising the parallel bars 29 having saw slots in their upper faces as shown, and made essentially U-shaped in cross-section, with the shallower bars 30 connecting the same, the whole being made of one piece and preferably of hard rubber. The several plates are forced tightly downward to engage the slots in this insulating support by the adjusting effect of the nut 21, so that the plates are prevented from longitudinal movement. The insulating bars 29 extend transversely to the plates, and the connecting bars 30 are made purposely shallower to prevent the accumulation of active material thereon which would otherwise tend to short-circuit the plates. In order to properly space the electrode plates at the sides to prevent them from accidentally short-circuiting the cell, I make use of spacing bars 31 formed with slots 32 therein, with which the electrode plates engage. These bars are connected together by vertical shallower bars 33, the whole being preferably cast of hard rubber in one piece. Preferably the bottom 2 of the can is provided with a number of struck-up bosses 34 forming sockets or recesses on the under side of the cell, in order that the latter may be properly supported in a suitable tray or crate.

In order to prevent the possibility of short-circuits between the plates by coming accidentally in contact with the side of the can, I preferably line the can on the interior with a sheet 35 of hard rubber, and in order to prevent the plates from engaging one another, separating rods or bars 36, essentially star-shaped in cross-section, may be utilized, as shown in Fig. 2, said bars being mounted in the vertical channels formed between adjacent pockets, so that each bar engages the corners of four adjacent pockets, as shown.

Having now described my invention, what I claim as new therein and desire to secure by Letters Patent is as follows:—

1. In a storage battery, a rectangular receptacle or can one or more of whose walls are provided with panels of transverse corrugations entirely surrounded by plane metal, substantially as set forth.

2. In a storage battery, a rectangular receptacle or can one or more of whose walls are provided with panels of transverse corrugations in the form of connected waves, said panels being surrounded by plane metal, substantially as set forth.

3. In a storage battery, the combination of a can, a plurality of plates therein, an insulating support for the bottom edges of said plates and means which exert a compressing stress upon said plates in a vertical direction, substantially as set forth.

4. In a storage battery, the combination of a can, a plurality of plates therein, an insulating support for the bottom edges of said plates and adjustable means for exerting any desired compressing stress upon said plates in a vertical direction, substantially as set forth.

5. In a storage battery, the combination of a can, a plurality of plates therein, an insulating support for the bottom edges of said plates and adjustable means co-operating with the can for exerting any desired compressing stress upon the plates in a vertical direction, substantially as set forth.

6. In a storage battery, the combination of a can, a plurality of plates therein, an insulating support for the bottom edges of said plates, and adjustable means coöperating with the can and electrically insulated therefrom for applying any desired downward pressure upon said plates, substantially as set forth.

7. In a storage battery, the combination of a can having a threaded opening, a plurality of plates, a conductor connected to said plates and extending through said opening, a washer surrounding the conductor in the opening and a nut threaded into the opening and engaging the washer to expand it diametrically, substantially as set forth.

8. In a storage battery, the combination of a can, a plurality of plates therein, a conductor connected to said plates and extending through the top of the can, a packing surrounding said conductor, and means for compressing said packing and simultaneously pressing the plates downward, substantially as set forth.

9. In a storage battery, the combination of a can, a plurality of plates therein, a conductor connected to said plates and extending through the top of the can, a packing surrounding said conductor, a nut for compressing said packing, and a terminal engaging said conductor and interlocking the said nut to prevent rotation of the latter, substantially as set forth.

10. In a storage battery, the combination of a can, a series of plates in said can, a series of insulating bars supporting the plates and extending transversely thereto, and adjustable means for exerting a compressing stress upon said plates in a vertical direction, substantially as set forth.

This specification signed and witnessed this 13th day of Novr. 1902.

THOS. A. EDISON.

Witnesses:
 FRANK L. DYER,
 J. F. RANDOLPH.